(12) United States Patent
Warner

(10) Patent No.: US 6,264,300 B1
(45) Date of Patent: Jul. 24, 2001

(54) METHODS OF PRINTING WITH AN INK JET PRINTER USING INKS WITH SAME HUE AND DIFFERENT SATURATION

(75) Inventor: William Thomas Warner, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/326,344

(22) Filed: Jun. 4, 1999

(51) Int. Cl.$^7$ .......................... B41J 29/377; B41J 2/205; B41J 29/38; B41J 2/21
(52) U.S. Cl. .................................. 347/18; 347/15; 347/9; 347/10; 347/14; 347/12; 347/43
(58) Field of Search .................................. 347/18, 15, 43, 347/9, 10, 11, 12, 14, 13, 40, 41, 42; 358/298

(56) References Cited

U.S. PATENT DOCUMENTS

| | | |
|---|---|---|
| 4,683,492 | 7/1987 | Sugiura et al. . |
| 4,686,538 | 8/1987 | Kouzato . |
| 4,713,746 | 12/1987 | Watanabe et al. . |
| 4,833,491 | 5/1989 | Rezanka . |
| 4,953,015 | 8/1990 | Hayasaki et al. . |
| 5,142,374 | 8/1992 | Tajika et al. . |
| 5,568,169 | 10/1996 | Dudek et al. . |
| 5,625,397 | 4/1997 | Allred et al. . |
| 5,648,801 | 7/1997 | Beardsley et al. . |
| 5,745,131 | * 4/1998 | Kneezel et al. ........................ 345/15 |

* cited by examiner

Primary Examiner—John Barlow
Assistant Examiner—Charles W. Stewart, Jr.
(74) Attorney, Agent, or Firm—Taylor & Aust, P.C.

(57) ABSTRACT

A method of printing with an ink jet printer uses inks of the same hue but of different saturation. The method utilizes a single dither array to control the printing application of the ink, preferably a full strength ink and a dilute ink to achieve gray scale printing. The dither array has threshold values defined for a subset of values of the range of pixel values of an image area, preferably 50% thereof, corresponding generally to threshold values between 0 and 127 inclusive. Pixel values are determined to be either within or outside of the threshold array range. Consequently, an ink dot is either printed or not, utilizing either the dilute or full strength ink. When the pixel value is within the threshold array range, the pixel value is then compared to the threshold value of the overlaid cell of the dither array. Where the pixel value is greater than the corresponding threshold value, an ink dot is printed utilizing dilute ink, else no dot is printed. When the pixel value is determined to be outside the threshold array range, a predetermined value is subtracted from the pixel value resulting in a difference pixel value. The difference pixel value is then compared to the threshold value of the overlaid cell of the dither array. When the difference pixel value is greater than the corresponding threshold value, a full strength ink dot is printed, else a dilute ink dot is printed.

24 Claims, 4 Drawing Sheets

METHODS OF PRINTING WITH AN INK JET PRINTER USING INKS WITH SAME HUE AND DIFFERENT SATURATION

BACKGROUND OF THE INVENTION

1. Field of the Invention

The present invention relates to ink jet printers, and, more particularly, to a method of printing with an ink jet printer having two inks of the same hue but of different saturation.

2. Description of the Related Art

Computer applications that require printing generally utilize a laser or ink jet printer which is connected to the computer. These computer driven electronic printing devices print in a binary manner wherein the output medium or image is divided into an array of picture elements, pixels, or pels. A printing device can print a dot onto a print medium at each pixel location or leave the pixel location blank. In the case of mono-color printers, all of the dots are printed with a single color, with the resulting output consisting of a 2-dimensional array of colored and blank pixels.

However, pictorial images such as those produced by computerized imaging, are continuous in tonality between either black (a printed dot for pixel) or white (blank pixel). If such a continuous tonality image is divided into pixels, each pixel could be assigned a grayscale color whose tonal value falls within a range of tonal values. In order to reproduce such continuous tonality images by electronic printing devices, it is necessary to assign each pixel a continuous tonality value.

During the printing process, the image to be printed is divided into a series of pixels and the value of the image in each pixel is quantized to produce a multi-bit digital word which represents the tonal value of the pixel. The image is thus converted into a bitstream of words which is provided to the electronic printing device. In order to convert the image data pixel value format into a format suitable for use by the electronic printing device, a half-toning process is performed on the word bitstream. The half-toning process may take many forms having many names. In one form, a comparison is made between each image data pixel value or word in the bitstream with a threshold value or level, and a binary output pixel value is generated depending on the relative values.

In one example, a continuous tonality processor for an image might generate a bitstream of numerical values representing the detected light intensities of the pixels. Commonly, the numerical value would be in a range of 0–255, corresponding to a 256 level gray scale or an eight-bit word. Then, when the bitstream is to be produced on the electronic printing device, the words of the image data are compared to either a single threshold value or an array of threshold values to produce the required binary output pixel stream, according to the half-toning process.

This half-toning process, however, can produce a loss or distortion of visual information between the original image and the printed image. Techniques have been developed to reduce this distortion. One such technique is error diffusion. Another technique, known as dithering, is an alternative to error diffusion. Dithering has been developed to reduce the number of computations necessary to process an image. A dither or threshold array is an array of predetermined (and generally different) threshold values with the same spacing as the image pixels. In this manner, the dither array is conceptually overlaid onto the image pixel array. If the dither array is smaller than the image array, then the dither array is repeated side-by-side or tiled over the image array to produce a repetitive pattern. Each pixel thus has two values associated with it, the actual image pixel tonal value and the dither or threshold value of the overlaid dither array cell to which it is compared.

One type of electronic printing device that may utilize the half-toning process is the ink jet printer. Ink jet printers typically include a printhead assembly which is carried by a carriage assembly which is scanned or moved across a print medium, such as paper, in a direction transverse to the feed direction of the paper. The printhead is generally carried on an ink jet cartridge assembly that has an ink reservoir. For a mono-color printhead used to jet a single color ink, e.g., black ink, onto the print medium, the printhead is moved across the print medium in one transverse direction, advanced a distance corresponding to the height of the printhead, and moved in a return direction back across the print medium in an opposite direction. During printing, ink is jetted from the ink emitting orifices in the printhead onto the paper as the printhead moves in transverse directions across the print medium. More particularly, as the print head assembly is scanned across the paper, ink is selectively jetted from any or all of the available nozzles in the print head assembly.

The image to be printed onto the print medium may be stored as data. The image can be represented as a collection of picture elements, otherwise referred to as pixels or pels that can be further represented by ink dots. It is also known to divide a plurality of pixels making up an image area into a plurality of rows of pixel locations or cells and a plurality of columns of pixel locations or cells.

By sequentially scanning the printhead across the print medium and advancing the print medium between the lateral scans a distance corresponding to the height of the printhead, ink may be selectively jetted onto the print medium at any pixel location within the image area. Various software algorithms are used in ink jet printing that generally control the timing, sequence and/or placement of the ink dots from the ink jet print head on the paper. Examples of such software algorithms include shingling and dithering with dithering accomplished by application of dither or threshold arrays.

In utilizing a dither array for gray scale printing in ink jet printers, ink dots are placed at selected locations within an image area by the print head. Typically, a single ink is used in association with a dither array during gray scale printing. Image data includes data for a single pixel location with an assigned gray scale value. If the gray scale value is greater than the threshold value within the dither array at the same pixel location, then the ink dot of the single color ink is placed at that pixel location. Dither or threshold arrays for gray scale printing provide the advantage of being computationally fast.

It is becoming more common for an ink jet printer to include multiple printheads, each printhead having ink of the same hue but of a different saturation. However, in order to use dithering with the same hue, different saturation ink, each print head/ink saturation must have a dither array associated therewith. The use of two dither arrays or, in general, using a dither array for each print head, slows down computation time. Dither arrays have heretofore been used with single density ink.

What is thus needed is a faster method for gray scale printing in an ink jet printer having multiple print heads associated with same hue, but different saturation ink.

SUMMARY OF THE INVENTION

The present invention is directed to a method of printing using an ink jet printer having inks with different saturation levels.

In accordance with an aspect of the present invention, the method utilizes a defined range of threshold values to determine the application of the inks by the ink jet printer.

In accordance with another aspect of the present invention, the method utilizes a single dither or threshold array to control the application of the inks by the ink jet printer.

The invention comprises, in one form thereof, a method of printing using an ink jet printer having different saturation inks. The method comprises defining an image area that overlies the print medium, the image area having a plurality of rows and columns of pixel locations, each pixel location having an assigned pixel value from a range of pixel values. A threshold array is defined having a plurality of rows and columns of cells, each cell having an assigned threshold value from a range of threshold values. For a set of rows and columns of pixel locations, each pixel value is determined to be within or outside of the range of threshold values. For a pixel value within the range of threshold values, either an ink dot is printed on the print medium using the lower saturation ink or an ink dot is not printed. For a pixel value outside of the range of threshold values, an ink dot is printed on the print medium using one of either the lower saturation ink or the greater saturation ink.

According to an aspect of the present method, when the pixel value is determined to be within the range of threshold values, the pixel value is then compared to a threshold value of the corresponding cell of the threshold array. An ink dot is then printed using the lower saturation ink only when the pixel value is greater than the corresponding threshold value.

According to an aspect of the present method, when the pixel value is determined to be outside the range of threshold values, a difference value is obtained between the particular pixel value and a subtractive value. The difference value is then compared to a threshold value of the corresponding cell of the threshold array, and printing an ink dot on the print medium using the greater saturation ink when the difference value is greater than the threshold value, else printing an ink dot on the print medium using the lower saturation ink.

In one form, the lower saturation ink can be considered a dilute ink and the greater saturation ink can be considered a full strength ink.

In another form the dilute ink is 50% of the strength of the full strength ink. In a preferred form, the inks are the same hue.

Because pixel values generally have the range of 0–255 inclusive, the range of threshold values for the dither array is a subset thereof. Also, since the dilute ink is preferably a 50% strength ink relative to the full strength ink, the range of threshold values is 50% or one-half (½) the range of pixel values. Thus the range of threshold values is 0–127 inclusive, as the range of pixel values is 0–255 inclusive.

An advantage of the present invention is that the ink jet printer having two inks of the same hue but different saturation is computationally fast.

Another advantage of the present invention is that gray scale printing is more precise.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
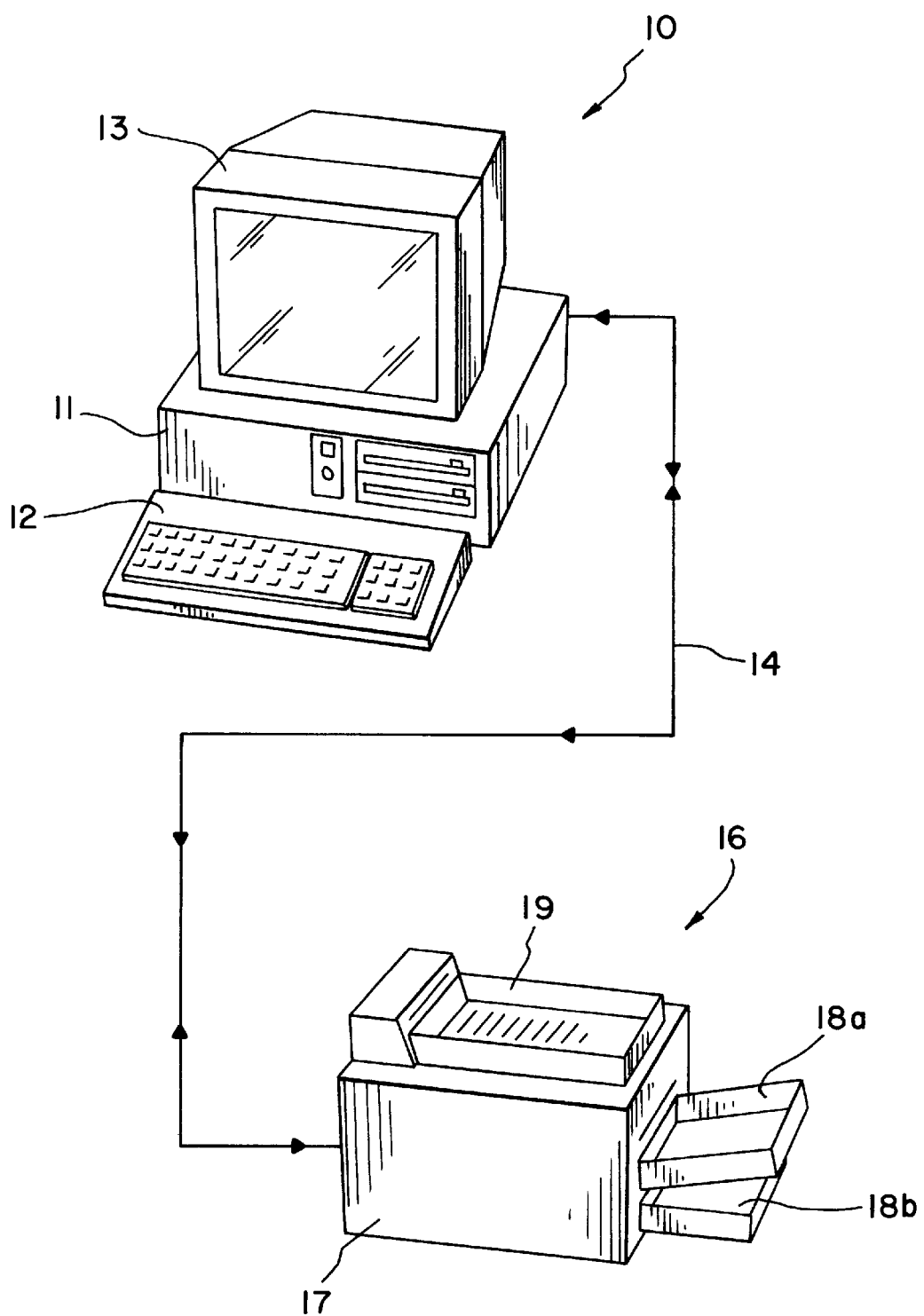
FIG. 1 is a perspective view of a printing system including a host computer in communication with an ink jet printer, with which the present method of printing may be carried out.

Referring now to the drawings and more particularly to FIG. 1, there is shown a host or personal computer 10 which includes a CPU (Central Processing Unit) 11 in communication with keyboard 12 and monitor or display 13. CPU 11 includes the typical internal components (not shown) including disk drives, memory, interface connectors, power supply, etc., while keyboard 12 and monitor 13 may also be of any type. Personal computer 10 is in communication with printing device 16, an ink jet printer, via multi-conductor cable 14. Ink jet printer 16 typically includes printer unit 17 that houses one or several print cartridges like that shown in FIG.

2 and discussed in further detail below, and the many other electrical and mechanical components (not shown) that allow printer 16 to function, but that are not necessary for an understanding of the present invention. Printer unit 17 may include two paper trays 18a and 18b for different paper sizes, or may include only one paper tray and a medium/paper out area 19 in which printed matter is deposited after printing.

Figure 2:
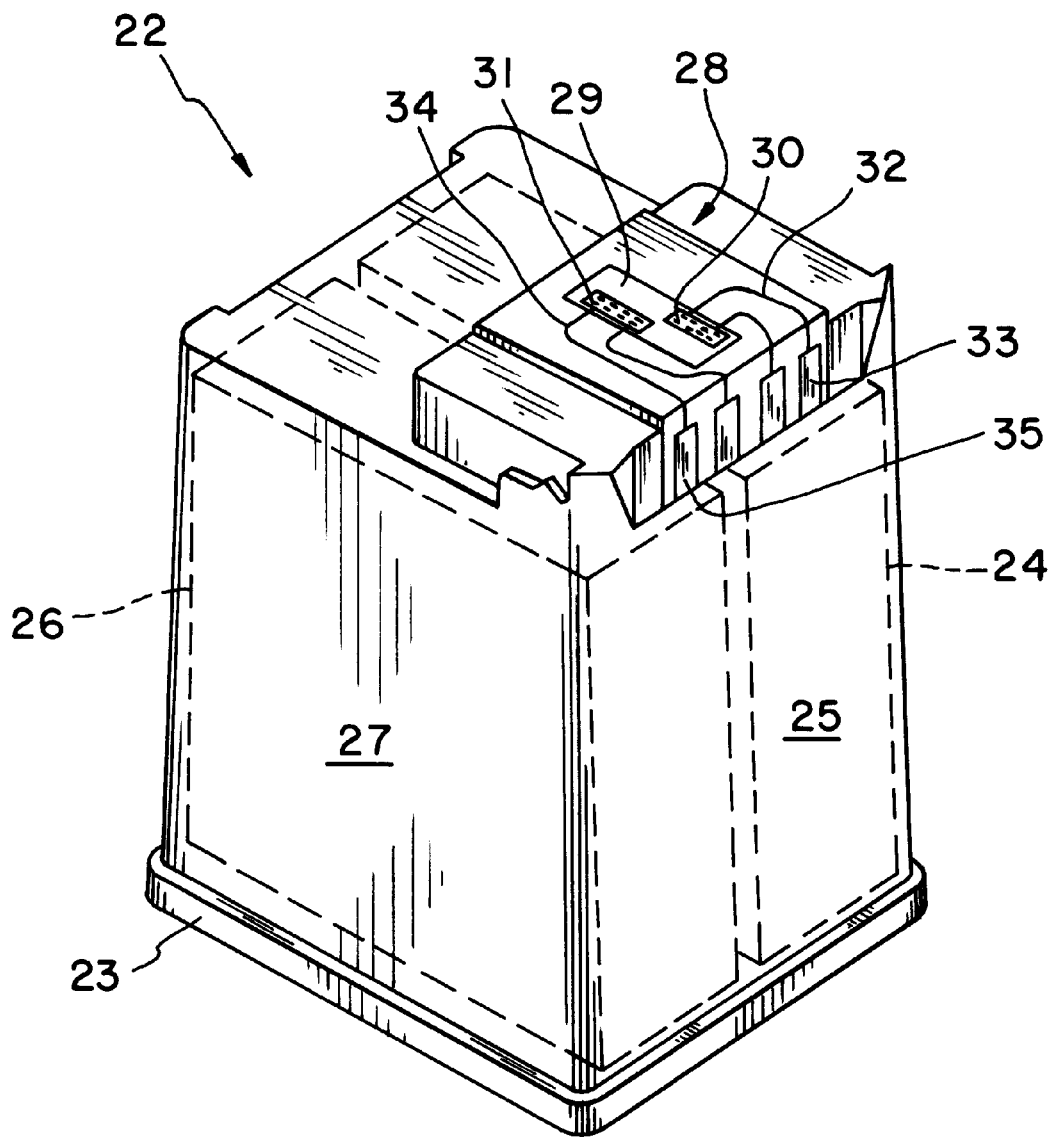
FIG. 2 is an enlarged, perspective view of an upside down ink jet cartridge particularly showing the print heads thereof.

In FIG. 2, there is shown ink jet cartridge 22 of the type that may be utilized in ink jet printer 16. Ink jet cartridge 22 has housing 23 generally of plastic that contains a first ink compartment or reservoir 24 containing a first ink 25, and a second ink compartment or reservoir 26 containing a second ink 27. In accordance with an aspect of the present invention, reservoir 24 or 25 contains a full strength ink of a particular color, while the other of reservoirs 24 and 25 contains a dilute ink of the same hue as the full strength ink. In gray scale printing the hue of the ink is black. However, hues other than black may be used. The dilute ink is a percentage strength relative to the full strength ink. In one form of the present invention, the dilute ink is 50% of the strength of the full strength ink. Of course, using the principles of the method of the present invention, other combinations of ink strength may be utilized other than 100% (full strength) and 50% (dilute) strength inks.

Cartridge 22 further includes a printhead assembly 28 on one end thereof that includes printhead substrate 29. Printhead substrate 29 has a first printhead 30 and a second printhead 31. First printhead 30 is in fluid communication with first ink reservoir 24 for delivering first ink 25 and in electrical communication with a first plurality of terminals 33, of which only one terminal is numbered, for receiving necessary electrical power and/or electrical signals from printer 16. Second printhead 31 is in fluid communication with second ink reservoir 26 for delivering second ink 27 and in electrical communication with a second plurality of terminals 35, of which only one terminal is numbered, for receiving necessary electrical power and/or electrical signals from printer 16. When cartridge 22 is installed in the carriage (not shown) of printer 16, first and second terminals 33 and 35 are in electrical communication with the appropriate electrical components of printer 16.

It should also be appreciated, with the present principles, that each ink may be contained in a single ink reservoir cartridge having a single printhead associated therewith, or a plurality of inks may be contained in a cartridge with a plurality of corresponding reservoirs and printheads, or various combinations thereof.

Figure 3:
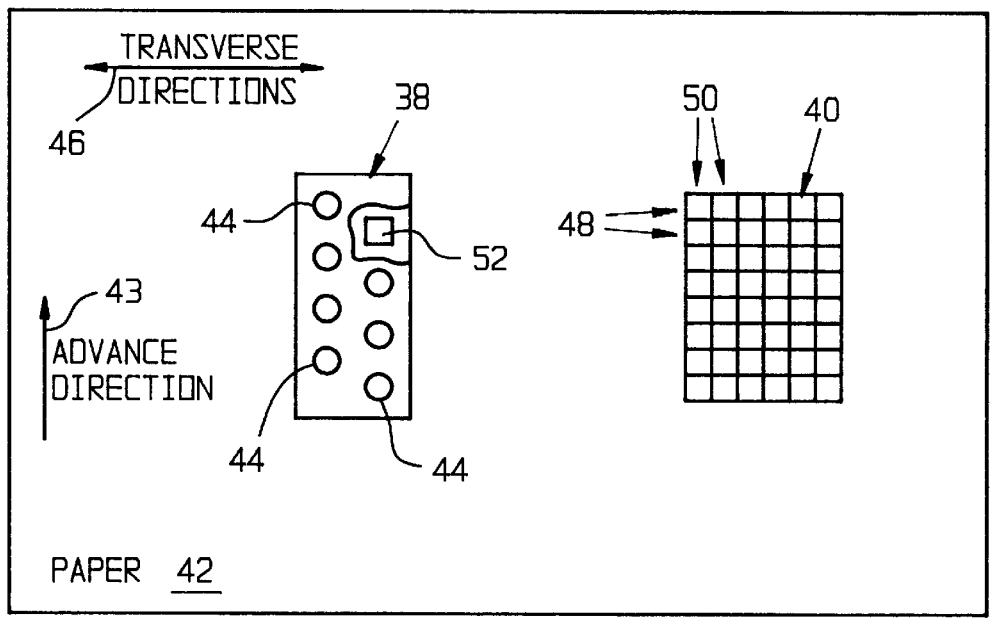
FIG. 3 is a schematic view of an exemplary printhead that may be used with the method of the present invention, shown in relationship to a portion of an image area on a print medium.

Referring now to FIG. 3, there is shown a schematic view of an exemplary printhead 38 that corresponds to printheads 30 and 31. It should be understood that any characteristic of printhead 38 is applicable to printheads 30 and 31 and unless indicated otherwise, reference to printhead 38 is equivalent to printhead 30 and 31. Printhead 38 is shown in relationship to a portion of an image area 40 on a print medium 42. Paper 42 is movable in an advance direction within ink jet printer 16, indicated by arrow 43.

Printhead 38 includes a plurality of ink emitting orifices 44 which are arranged in an array of vertically adjacent ink emitting orifices. Typically, for manufacturing purposes, the vertically adjacent ink emitting orifices 44 are disposed in a staggered relationship relative to each other. That is, the bottom ink emitting orifice 44 shown in the right hand column is disposed vertically adjacent to the bottom ink emitting orifice 44 shown in the left hand column. In the embodiment shown, printhead 38 includes eight ink emitting orifices that are arranged in a staggered and vertically adjacent relationship relative to each other.

Printhead 38 is carried in a known manner by a carriage assembly (not shown) that is movable in directions transverse to advance direction 43, as indicated by double-headed arrow 46. The carriage assembly and printhead 38 may be configured for single directional printing or bidirectional printing, in known manner.

Image area 40 overlying at least a portion of print medium or paper 42 is defined in part by the vertical center-to-center spacing between adjacent ink emitting orifices 44. Image area 40 includes a plurality of rows of pixel locations 48 and a plurality of columns of pixel locations 50. Each pixel location within each row 48 of pixel locations has a height that corresponds to a height of an associated ink emitting orifice 44 on printhead 38. Moreover, in the embodiment shown, each pixel location within each column 50 of pixel locations has a width that corresponds to the height dimension of each row 48. That is, each pixel location is substantially square. However, it is also to be understood that each pixel location may have a width that differs from the height depending on the resolution the printhead cartridge driver motor.

Printhead 38 includes a plurality of ink jetting heaters, one of which is shown and referenced as 52 in FIG. 3, that are respectively associated with the plurality of ink emitting orifices 44. Each ink jetting heater is actuatable at selected points in time during a scan of printhead 38 across paper 42 to jet the ink from an associated ink emitting orifice 44. Actuation of an ink jetting heater 52 at a selected point in time causes the rapid formation of a bubble at the base of an associated ink emitting orifice 44, thereby jetting the ink onto the paper 42, generally resulting in an ink dot, in known manner. Again, it should be appreciated that other types of printheads can be used with the method of the present invention.

Figure 4:
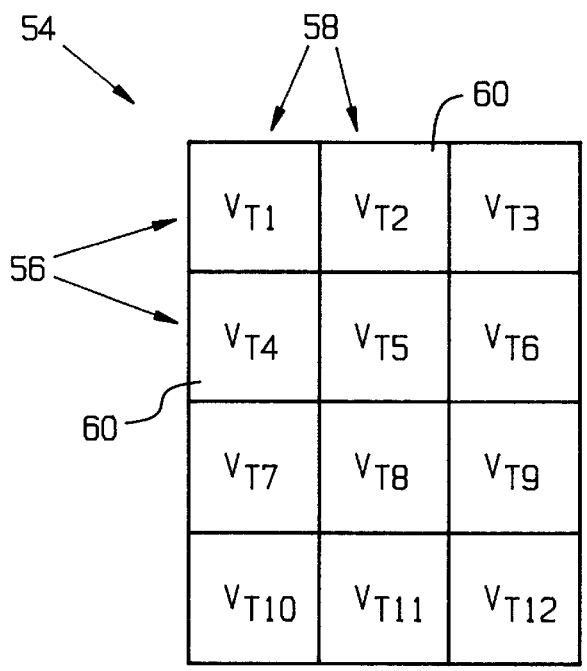
FIG. 4 is a diagram of an exemplary dither array in accordance with the present invention.

With additional reference now to FIG. 4, there is shown an exemplary dither or threshold array 54, having a plurality of rows 56 of cells 60, and plurality of columns 58 of cells 60. A dither or threshold array is an M×N array or a plurality of rows and columns of cells that resides in software. In utilizing dither arrays, typically a 16×16 array is chosen to overlie a 16×16 array of pixel locations of the image area, however, other size arrays may be utilized. Each cell 60 of array 54 is associated with a threshold value $V_{TX}$, where "X" is a cell number of the array. Thus, in 4×3 array 54, there are twelve (12) cells 60 with associated threshold values $V_{T1}$ to $V_{T12}$ respectively. In accordance with an aspect of the present invention, threshold values $V_{T1}$ to $V_{T12}$ have a total range of one-half (½) or 50% of the pixel values associated with the image data. For the values 0 to 255 inclusive (a total of 256 steps or degrees) encoded as an 8-bit word, the pixel value for the image data represents a continuous single color tonality from white, or 0% intensity of the single color corresponding to "0" on the scale, to full intensity or 100% of the single color corresponding to "255" on the scale. In this instance, threshold values $V_{T1}$ to $V_{T12}$ have a 128 degree range, being one-half (½) or 50% of the pixel values. This can be represented as threshold values 0 to 127 inclusive. It should be appreciated that the selection of a particular threshold value for each cell of the dither array is beyond the scope of this disclosure.

An obvious solution to printing using two same color, different intensity inks utilizing two separate dither arrays would be to divide the pixel values into an upper range and a lower range. The dilute ink would be used for the lower range while the full strength ink would be used for the upper range. In practice however, unless the mixture ratio between the inks is extremely precise, there is a marked boundary between the region covered by the dilute ink and that covered by the full strength ink. Rather, the present method uses the dilute ink for the lower range and a combination of dilute and full strength inks for the upper range.

With the aid of FIGS. 5–7, a method of use of different density (intensity) inks of the same color in accordance with an aspect of the present method will be discussed. It should be assumed that the term "gray ink" is interchangeable with "dilute ink", "first ink" or "lower saturation ink" and variations thereof, while the term "black ink" is interchangeable with "full strength ink", "second ink" or "greater saturation ink" and variations thereof.

Figure 5:
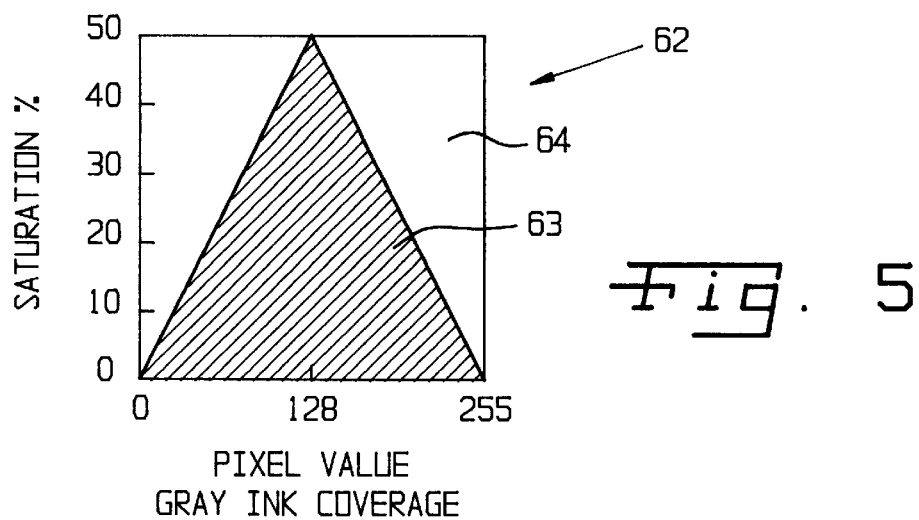
FIG. 5 is a graph of gray or dilute ink coverage by saturation percentage versus pixel value.

In FIG. 5, graph 62 is a depiction of pixel value versus gray ink saturation percent, wherein the gray ink is chosen to be 50% of the intensity or density of the full intensity or density ink. Gray ink coverage is denoted by area 63, while no ink is denoted by area 64. In accordance with an aspect of the present method, from pixel value 0 to pixel value 127, the saturation percent of gray ink, or coverage thereof, increases linearly from 0% to 100%. From pixel value 128 to pixel value 255, gray ink coverage decreases from 100% to 0%. Since the gray ink 63 is assumed to be 50% as dark as the black ink, a 0 to 100% saturation corresponds to a saturation increase from 0% black at pixel value 0, to 50% black at pixel value 127, and then a saturation decrease from 50% black to 0% black at pixel value 255. The slope of this curve can be considered to be 1 from 0 to 127, and −1 from 128 to 255.

Figure 6:
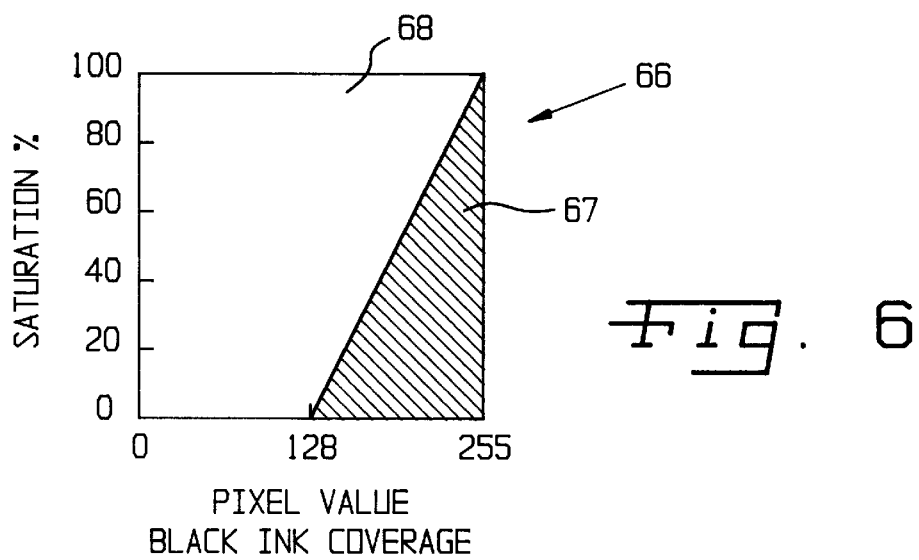
FIG. 6 is a graph of black or full strength ink coverage by saturation percentage versus pixel value.

In FIG. 6, graph 66 is a depiction of the pixel value versus black ink saturation percent, wherein the black ink is a full strength ink. Black ink coverage is denoted by area 67, while no ink coverage is denoted by area 68. In accordance with an aspect of the present method, from pixel value 0 to 127, no black ink is used. From pixel value 128 to 255, the coverage of black ink increases linearly from 0% to 100%. The saturation is 0% black at pixel value 128 to 100% black at pixel value 255. The slope of this curve can be considered 2 from pixel value 128 to pixel value 255.

Figure 7:
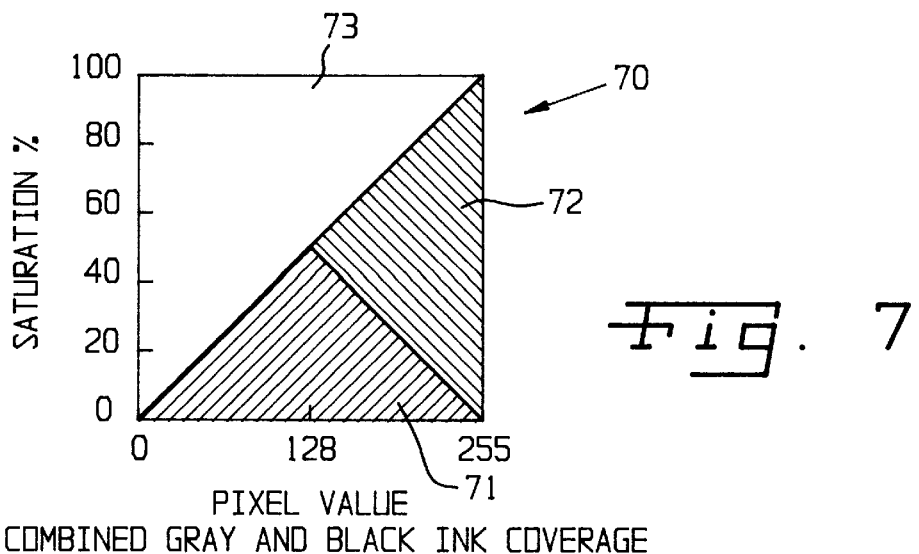
FIG. 7 is a graph of the combined gray (dilute) and black (full strength) ink coverage by saturation percentage versus pixel value.

In FIG. 7, graph 70 is a depiction of the pixel values corresponding to the combined gray ink, denoted area 71, and black ink, denoted area 72, coverage in accordance with their respective graphs depicted in FIGS. 5 and 6, versus saturation percent. Simple addition of the curves of FIGS. 5 and 6 yields the curve of FIG. 7 which gives a continuous linear transition from 0% black at pixel value 0 to 100% black at pixel value 255 using two intensity inks.

In this manner as depicted in FIGS. 5–7 and described above, the use of a gray ink and a black ink produces a continuous, linear increase in black density ink from 0 to 100%, corresponding to pixel values 0 to 255.

In one form, the present method utilizes the properties depicted in the graphs of FIGS. 5–7 to control the application of the different intensity inks by the printhead of the printer. For printing an image by printer 16, image area 40 is defined having a plurality of rows 48 and columns 50 of pixel locations with each location associated with a pixel value from a range of pixel values. The range of pixel values is typically 0 to 255. Dither array 54 is defined having a plurality of rows 56 and columns 58 of cells 60, each cell 60 associated with a threshold value $V_{T1}$–$V_{T12}$ from a range of threshold values. In accordance with an aspect of the present method, the range of threshold values is 0–127, representing 50% of the total range of pixel values or of the dilution or intensity of the inks. Since the range of threshold values is the lower range of possible pixel values (being 0–255), a pixel value will not be below 0. Therefore, in determining whether a pixel value is within or outside of the range of threshold values, it is only necessary to compare the pixel value to the upper limit value or threshold limit of the range of threshold values. Each pixel value of a pixel location is first determined to be within or outside of the range of threshold values. If the pixel value is within the range of threshold values, then either an ink dot is printed on the print medium utilizing the gray ink, or no ink dot is printed. This can be understood with reference to FIG. 7 wherein in the range of pixel values 0–127, which correspond to threshold values, only gray ink or no ink is used. Of course, the saturation percentage of the gray ink printed onto the print medium will follow graph 70. If the pixel value is outside the range of threshold values, then an ink dot is printed onto the print medium using either the gray ink or the black ink. This again can be understood with reference to FIG. 7, wherein in the range of pixel values 128–255, only gray and black ink are used.

In accordance with an aspect of the present method, if the pixel value is within the range of threshold values, here 0–127, the pixel value is then compared to a threshold value of a cell of the conceptually overlaid dither array. If the pixel value is greater than the threshold value, the ink dot is printed onto the print medium using the gray ink, else no ink dot is printed. If the pixel value is outside the range of threshold values, a difference value is determined between a subtractive value and the pixel value. The difference value is then compared to a threshold value of a cell of the conceptually overlaid dither array. If the difference value is greater than the threshold value an ink dot is printed using the black ink, else an ink dot is printed using the gray ink. Again, the saturation percentage of the gray and black inks will follow graph 70. In this manner, only one dither array needs to be defined.

For example, if a pixel value of a pixel location from an image area is 120, and the range of threshold values is 0–127, the pixel value would be determined to be within the range of threshold values. Thus, either no ink dot is printed or an ink dot is printed using the gray ink. The pixel value is then compared against the threshold value of the overlaid cell of the dither array. If, for example, the threshold value of the overlaid cell is 30, then pixel value 120 is greater, so an ink dot is printed using the gray ink. If, for example, the threshold value is 125, then pixel value 120 is less than the threshold value and no ink dot is printed.

As another example, if a pixel value of a pixel location from an image area is 201, and the range of threshold values is 0–127, the pixel value would be determined to be outside the range of threshold values. Thus, an ink dot is printed on the print medium using either the gray or black ink. A difference value is obtained by subtracting 128, a subtractive value, from the pixel value. Here the pixel value is 201 so the difference value would be 201–128=73 which is also the modified pixel value. The modified pixel value or difference value is then compared to the threshold value extracted from or corresponding to the cell of the overlaid dither array. If, for example, the threshold value is 45, the difference value of 73 is greater than 45 and thus an ink dot is printed on the print medium using the black ink. If, for example, the threshold value is 113, the difference value of 73 is less than 113, and thus an ink dot is printed on the print medium using the gray ink.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing on a print medium with an ink jet printer using a first ink and a second ink, said method comprising the steps of:
    defining an image area that overlies the print medium, said image area having a plurality of rows and columns of pixel locations, each said pixel location having an assigned pixel value from a range of pixel values;
    defining a range of threshold values; and
    for a set of rows and columns of said pixel locations, comparing each said pixel value associated with said pixel locations with said range of threshold values; and
    for a pixel value within said range of threshold values, choosing one of printing an ink dot on the print medium using the second ink and not printing an ink dot; and
    for a pixel value outside of said range of threshold values, printing an ink dot on the print medium using one of the first and second inks.

2. The method of claim 1, wherein said range of threshold values has an upper limit value, and each pixel value is determined to be within the range of threshold values by comparing the pixel value to said upper limit value.

3. The method of claim 1, wherein the second ink is 50% of the first ink.

4. The method of claim 1, wherein the first and second inks are the same hue.

5. The method of claim 1, further comprising the steps of:
    defining a threshold array having a plurality of rows and columns of cells, each cell having an associated threshold value from said range of threshold values;
    wherein for a pixel value within said range of threshold values, comparing the pixel value to a threshold value of the cell of the threshold array corresponding to the pixel location and printing the ink dot on the print medium using the second ink when said pixel value is greater than said threshold value, else not printing the ink dot; and
    wherein for a pixel value outside of said range of threshold values, obtaining a difference value between the particular pixel value and a subtractive value, comparing said difference value to a threshold value of the cell of said threshold array corresponding to the pixel location and printing an ink dot on the print medium using the first ink when said difference value is greater than said threshold value, else printing an ink dot on the print medium using the second ink.

6. The method of claim 5, wherein said range of threshold values is 0–127 inclusive, and said range of pixel values is 0–255 inclusive.

7. The method of claim 5, wherein said subtractive value is 128.

8. The method of claim 1, wherein said first and second inks have different saturations.

9. A method of printing on a print medium with an ink jet printer having a first saturation ink and a second saturation ink, said method comprising the steps of:
    defining an image area that overlies the print medium, said image area having a plurality of rows and columns of pixel locations, each said pixel location having an associated pixel value from a range of pixel values;
    defining a dither array having a plurality of rows and columns of cells, each cell having an assigned dither value from a range of dither values;
    for a given set of rows and columns of said pixel locations, determining whether each said pixel value is within said range of dither values; and
    for a pixel value within said range of dither values, choosing one of printing an ink dot on the print medium at the pixel location corresponding to the particular pixel value using the second saturation ink and not printing the ink dot depending on the comparison of the particular pixel value to a dither value of a cell of said dither array corresponding to said pixel location; and
    for a pixel value outside said range of dither values, printing an ink dot on the print medium at the corresponding pixel location using one of the first saturation ink and the second saturation ink depending on the comparison of the particular pixel value to a dither value of a cell of said dither array corresponding to said pixel location.

10. The method of claim 9, wherein said range of dither values has an upper limit value, and each pixel value is determined to be within said range of dither values by comparing each pixel value to said upper limit value.

11. The method of claim 9, wherein said first and second saturation inks are the same hue.

12. The method of claim 11, wherein said color is black.

13. The method of claim 11, wherein said first saturation ink is a full strength ink and said second saturation ink is a dilute ink relative to said full strength ink.

14. The method of claim 13, wherein said dilute ink is 50% of said first saturation ink.

15. The method of claim 9, wherein for a pixel value within said range of dither values, comparing the pixel value to a dither value of the cell of the dither array corresponding to the pixel location and printing the ink dot with the second saturation ink when the pixel value is greater than the dither value, else not printing the ink dot; and wherein for a pixel value outside of said range of dither values, obtaining a difference value between the particular pixel value and a subtractive value, comparing said difference value to a dither value of the cell of said dither array corresponding to the pixel location and printing an ink dot on the print medium using the first saturation ink when said difference value is greater than said dither value, else printing an ink dot on the print medium using the second saturation ink.

16. The method of claim 15, wherein said range of dither values is 0–127 inclusive and said range of pixel values is 0–255 inclusive.

17. The method of claim 16, wherein said subtractive value is 128.

18. A method of printing on a print medium using an ink jet printer having a full strength ink and a dilute ink, said method comprising the steps of:

defining an image area that overlies the print medium, said image area having a plurality of rows and columns of pixel locations, each said pixel location having an associated pixel value from a range of pixel values;

defining a threshold array having a plurality of rows and columns of cells, each cell having an associated threshold value from a range of threshold values being a subset of said range of pixel values; and determining whether a particular pixel value is within said range of threshold values; and for a pixel value within said range of threshold values, comparing that pixel value to a threshold value of a corresponding cell of the threshold array and choosing one of printing an ink dot on the print medium using the dilute ink and not printing an ink dot when the pixel value is greater than the threshold value; and for a pixel value outside said range of threshold values, printing an ink dot on the print medium with one of the full strength ink and the dilute ink.

19. The method of claim 18, wherein said range of threshold values has an upper limit value, and each pixel value is determined to be within said range of threshold values by comparing the pixel value to said upper limit value.

20. The method of claim 18, wherein the full strength ink and dilute ink are the same hue.

21. The method of claim 18, wherein said hue is black.

22. The method of claim 18, wherein said dilute ink is 50% of said full strength ink.

23. The method of claim 18, wherein for the pixel value outside said range of threshold values, obtaining a difference pixel value between the particular pixel value and a subtractive value, comparing said difference pixel value to a threshold value of a corresponding cell of the threshold array; and printing an ink dot on the print medium using the full strength ink when said difference pixel value is greater than said threshold value, else printing an ink dot on the print medium using the dilute ink.

24. The method of claim 23, wherein said range of pixel values is 0–255 inclusive, said range of threshold values is 0–127 inclusive, and said predetermined subtractive value is 128.

* * * * *